United States Patent
Parkvall et al.

(10) Patent No.: US 11,330,597 B2
(45) Date of Patent: May 10, 2022

(54) SIGNALING REFERENCE SIGNAL LOCATIONS IN SLOTS AND MINI-SLOTS

(71) Applicant: Telefonaktiebolaget LM Ericsson (publ), Stockholm (SE)

(72) Inventors: Stefan Parkvall, Bromma (SE); Robert Baldemair, Solna (SE); Daniel Larsson, Lund (SE); Erik Dahlman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 19 days.

(21) Appl. No.: 16/623,907

(22) PCT Filed: Jun. 26, 2018

(86) PCT No.: PCT/SE2018/050685
§ 371 (c)(1),
(2) Date: Dec. 18, 2019

(87) PCT Pub. No.: WO2019/004909
PCT Pub. Date: Jan. 3, 2019

(65) Prior Publication Data
US 2021/0153203 A1    May 20, 2021

Related U.S. Application Data

(60) Provisional application No. 62/524,900, filed on Jun. 26, 2017.

(51) Int. Cl.
*H04W 72/04*    (2009.01)
*H04L 5/00*    (2006.01)
*H04W 72/12*    (2009.01)

(52) U.S. Cl.
CPC ....... *H04W 72/0493* (2013.01); *H04L 5/0048* (2013.01); *H04W 72/042* (2013.01);
(Continued)

(58) Field of Classification Search
CPC .......... H04W 72/0493; H04W 72/042; H04W 72/0446; H04W 72/1273; H04W 72/1289; H04L 5/0048
(Continued)

(56) References Cited

U.S. PATENT DOCUMENTS

| 2013/0039272 A1 | 2/2013 | Chen |
| 2019/0098520 A1* | 3/2019 | Kim ...................... H04W 76/28 |
| 2021/0136815 A1* | 5/2021 | Kim ...................... H04W 56/00 |

FOREIGN PATENT DOCUMENTS

| CN | 102326340 A | 1/2012 |
| CN | 102377509 A | 3/2012 |

(Continued)

OTHER PUBLICATIONS

Intellectual Property India Examination Report in India Application No. 201947053072, dated Feb. 25, 2021, 6 pages (translated).
(Continued)

*Primary Examiner* — Peter G Solinsky
(74) *Attorney, Agent, or Firm* — Baker Botts, LLP

(57) ABSTRACT

According to some embodiments, a method for use in a wireless transmitter of a wireless communication network comprises providing control information relating to a slot. The control information includes an indication of whether the slot is of a first type or a second type. A slot of the first type starts at a slot interval boundary, and a slot of the second type either starts between slot interval boundaries and has arbitrary length or starts at a slot interval boundary and has reduced length. The control information includes an implicit or explicit reference signal timing indication if the slot is of the second type. The method further comprises transmitting the control information to a wireless receiver.

22 Claims, 10 Drawing Sheets

800

812 - receive control information relating to a slot, the control information including an indication of a slot type 814 - determine, based on the indication of the slot type, whether the slot is of a first or a second type

(52) U.S. Cl.
CPC ... *H04W 72/0446* (2013.01); *H04W 72/1273* (2013.01); *H04W 72/1289* (2013.01)

(58) Field of Classification Search
USPC .......................................................... 370/329
See application file for complete search history.

(56) References Cited

FOREIGN PATENT DOCUMENTS

| CN | 102577222 A | 7/2012 |
| CN | 105144803 A | 12/2015 |
| EP | 1 757 151 B1 | 2/2007 |
| RU | 2524392 C2 | 7/2014 |

OTHER PUBLICATIONS

PCT Written Opinion of the International Preliminary Examining Authority issued for International application No. PCT/SE2018/050685—dated May 14, 2019.
PCT International Preliminary Report on Patentability issued for International application No. PCT/SE2018/050685—dated Sep. 11, 2019.
3GPP TSG RAN WG1 NR Ad-Hoc Meeting; Spokane, USA; Source: LG Electronics; Title: Discussion on frame structure for Mini-slot (R1-1700516)—Jan. 16-20, 2017.
TSG-RAN WG1 NR AdHoc; Spokane, WA, USA; Source: Ericsson; Title: Summary of email discussions on downlink control signaling (R1-1701036)—Jan. 16, 20, 2017.
3GPP TSG RAN WG1 89 Meeting; Hangzhou, China; Source: Huawei, HiSilicon; Title: Unified design for slot and mini-slot (R1-1708121)—May 15-19, 2017.
PCT International Search Report issued for International application No. PCT/SE2018/050685—dated Sep. 18, 2018.
Japan Patent Office Action in Japan Patent Application No. 2019-570971 dated Apr. 9, 2021 (with translation).
"Mini-slot for analog beam-forming," R1-1700629, 3GPP TSG RAN WG1 AH_NR Meeting, NTT Docomo, Inc., Jan. 16-20, 2017.
"Two Stage DCI Design for NR DL Control Channel," R1-1702274, 3GPP TSG RAN WG1 Meeting #88, AT&T, Feb. 13-17, 2017.
"On slot and mini-slot description," R1-1705777, TSG-RAN WG#88bis, Ericsson, ZTE, Apr. 3-7, 2017.
"Discussion on flexible length scheduling," R1-1710397, 3GPP TSG RAN WG1 NR Ad-Hoc#2, Vivo, Jun. 27-30, 2017.
Written Opinion from the Intellectual Property Office of Singapore in Application No. 11201911818T, dated Jun. 28, 2021 (translated).
Korea Patent Office, Notice of Preliminary Rejection in Korea Patent Application No. 2020-7002007 dated Feb. 9, 2021 (translated).
Korea Patent Office, Notice of Final Rejection in Korea Patent Application No. 2020-7002007 dated Aug. 10, 2021 (translated).
TSG-RAN WG1 AH_NR Meeting, R1-1700424, ZTE et al., "About mini-slot design," Jan. 16-20, 2017.
China Patent Office, Notification to Grant Patent Right for Invitation in CN Application No. 201880055426.3, dated Mar. 23, 2022.

\* cited by examiner

SIGNALING REFERENCE SIGNAL LOCATIONS IN SLOTS AND MINI-SLOTS

PRIORITY

This nonprovisional application is a National Stage Filing under 35 U.S.C. § 371 of International Patent Application Ser. No. PCT/SE2018/050685 filed Jun. 26, 2018 and entitled "SIGNALING REFERENCE SIGNAL LOCATIONS IN SLOTS AND MINISLOTS" which claims priority to U.S. Provisional patent application Ser. No. 62/524,900 filed Jun. 26, 2017 both of which are hereby incorporated by reference in their entirety.

TECHNICAL FIELD

Particular embodiments are directed to wireless communications and, more particularly, to signaling a location of reference signals within a slot and/or a mini-slot.

INTRODUCTION

Third Generation Partnership Project (3GPP) 5G New Radio (NR) is based on orthogonal frequency-division multiplexing (OFDM) with a scalable numerology. For very large cells, or for coexistence with long term evolution (LTE) and narrowband internet-of-things (NB-IoT) on the same carrier, 15 kHz subcarrier spacing may be used. Higher subcarrier spacing of 30 kHz up to 480 kHz are also supported. For example, 30 kHz or 60 kHz may be used for smaller cells, and 120 kHz is beneficial in the mm-wave range to mitigate phase noise. Transmissions are organized in slots of fourteen symbols, each with the possibility for fast hybrid automatic repeat request (HARQ) feedback to minimize latency.

Ultra-high reliability and low latency (URLLC) refers to applications where data needs to be delivered at with low latency while maintaining a high reliability. NR achieves low latency and high-reliability using mini-slots. Mini-slots can be significantly shorter than the slots typically used for regular data transmission. When urgent data arrives at a base station, a mini-slot transmission may preempt an ongoing slot-based transmission. Mini-slots also benefit transmissions in unlicensed spectrum because min-slots facilitate starting a transmission immediately after a successful listen-before-talk (LBT) procedure, without waiting for a slot boundary.

SUMMARY

The embodiments described herein include methods and apparatus for signalling the location of reference signals within a slot or mini-slot. According to some embodiments, a method for use in a wireless transmitter of a wireless communication network comprises providing control information relating to a slot. The control information includes a variable property allowing a receiving node to determine, based on the variable property, whether the slot is of a first or a second type. A slot of the first type starts at a slot interval boundary, and a slot of the second type starts between slot interval boundaries, including slot boundaries. The control information includes an implicit or explicit reference signal timing indication if the slot is of the second type. The method further comprises transmitting the control information to a wireless receiver.

In particular embodiments, an explicit reference signal timing indication is absent in the control information whenever the slot is of the first type, such absence signifying a predefined reference signal timing, such as a fixed or semi-statically configured reference signal timing.

In particular embodiments, the reference signal timing indication relates to a reference signal assisting receipt of the slot. the reference signal may comprise a demodulation reference signal (DM-RS). The reference signal timing indication may be associated with a plurality of reference signals. Each reference signal in the plurality of reference signals may have independent timing. A first reference signal in the plurality of reference signals may have independent timing and a second reference signal in the plurality of reference signals may have a fixed offset relative to the first reference signal. The reference signal timing indication may comprise an explicit timing indication of the first but not of the second reference signal.

In particular embodiments, the variable property is the value of a parameter associated with slot type. The parameter may be represented as a single bit. The variable property may comprise the presence of an optional field of the control information. The variable property may be a format of the control information, the format being one of two or more predefined formats, each associated with the first or second type.

In particular embodiments, an explicit reference signal timing indication is absent in the control information for at least one reference signal, such absence signifying a predefined reference signal timing. The predefined reference signal timing is a symbol with a predefined offset relative to a symbol in the slot being one of: an initial symbol for transmission of control data, an initial symbol for transmission of at least data, an initial symbol for transmission of data only, an initial symbol comprising a control resource set (CORESET) to be monitored for downlink control signaling, an initial symbol in a slot interval, a final symbol for transmission of control data, a final symbol for transmission of at least data, a final symbol for transmission of data only, a final symbol comprising a control resource set (CORESET) to be monitored for downlink control signaling, and a final symbol in a slot interval.

In particular embodiments, the predefined reference signal timing is a center symbol. The center symbol may be the $(N+1)^{th}$ symbol in a data burst comprising $2N+1$ symbols, where N is an integer, and wherein the center symbol is the $N^{th}$ or $(N+1)^{th}$, symbol in a data burst comprising $2N$ symbols. The predefined reference signal timing may be a symbol with a predefined zero or non-zero offset relative to an indicated data channel starting position.

In particular embodiments, an indication of the data channel starting position is comprised in the control information. The predefined offset may be semi-statically configured.

In particular embodiments, the control information comprises an explicit reference signal timing indication for at least one reference signal. The explicit reference signal timing indication represents a variable offset ($L_{DMRS}$) relative to one of: an initial symbol for transmission of control data, an initial symbol for transmission of at least data, an initial symbol for transmission of data only, an initial symbol comprising CORESET, an initial symbol in a slot interval, a final symbol for transmission of control data, a final symbol for transmission of at least data, a final symbol for transmission of data only, a final symbol comprising CORESET, and a final symbol in a slot interval. The explicit reference signal timing indication may represent a variable offset ($L_{DMRS}$) relative to an indicated data channel starting position. An indication of the data channel starting position may be included in the control information.

In particular embodiments, the slot of the second type is a mini-slot. The mini-slot may comprise a schedulable number of symbols. The schedulable number of symbols in a mini-slot may be restricted to values less than the number of symbols of a slot interval.

In particular embodiments, the slot of the first type has full length or reduced length. The reduced-length slot of the first type may be a mini-slot.

In particular embodiments, the slot is an uplink slot or a downlink slot. The control information may be a downlink assignment. The control information may be DCI. In particular embodiments, transmitting the control information to the wireless receiver comprises transmitting the slot. Transmitting the control information to the wireless receiver may comprise transmitting the slot on a spectrum operated with configurable subcarrier spacing.

In particular embodiments, the slot is a transmission burst. The slot interval may be one in a sequence of contiguous time segments independent of transmission.

In particular embodiments, the wireless transmitter is a network node, such as a gNB or a wireless device, such as a UE.

According to some embodiments, a method for use in a wireless receiver of a wireless communication network comprises receiving control information relating to a slot. The control information includes a variable property. The method further comprises determining, based on the variable property, whether the slot is of a first or a second type. A slot of the first type starts at a slot interval boundary and a slot of the second type starts between slot interval boundaries, including slot boundaries. If the slot is of the second type, an implicit or explicit reference signal timing indication is received as part of the control information.

In particular embodiments, an explicit reference signal timing indication is absent in the control information whenever the slot is of the first type, such absence signifying a predefined reference signal timing, such as a fixed or semi-statically configured reference signal timing.

In particular embodiments, the reference signal timing indication relates to a reference signal assisting receipt of the slot. The reference signal may comprise a demodulation reference signal (DM-RS). The reference signal timing indication may be associated with a plurality of reference signals. Each reference signal in the plurality of reference signals may have independent timing. A first reference signal in the plurality of reference signals may have independent timing and a second reference signal in the plurality of reference signals may have a fixed offset relative to the first reference signal. The reference signal timing indication may comprise an explicit timing indication of the first but not of the second reference signal.

In particular embodiments, the variable property is the value of a parameter associated with slot type. The parameter may be represented as a single bit. The variable property may be the presence of an optional field of the control information. The variable property may be a format of the control information, the format being one of two or more predefined formats, each associated with the first or second type.

In particular embodiments, an explicit reference signal timing indication is absent in the control information for at least one reference signal, such absence signifying a predefined reference signal timing. The predefined reference signal timing may be a symbol with a predefined offset relative to a symbol in the slot being one of: an initial symbol for transmission of control data, an initial symbol for transmission of at least data, an initial symbol for transmission of data only, an initial symbol comprising a control resource set (CORESET) to be monitored for downlink control signaling, an initial symbol in a slot interval, a final symbol for transmission of control data, a final symbol for transmission of at least data, a final symbol for transmission of data only, a final symbol comprising a control resource set (CORESET) to be monitored for downlink control signaling, and a final symbol in a slot interval.

In particular embodiments, the predefined reference signal timing is a center symbol. The center symbol may be the $(N+1)^{th}$ symbol in a data burst comprising $2N+1$ symbols, where N is an integer, and wherein the center symbol is the $N^{th}$ or $(N+1)^{th}$ symbol in a data burst comprising $2N$ symbols. The predefined reference signal timing may be a symbol with a predefined zero or non-zero offset relative to an indicated data channel starting position. An indication of the data channel starting position may be included in the control information. The predefined offset may be semi-statically configured.

In particular embodiments, the control information comprises an explicit reference signal timing indication for at least one reference signal. The explicit reference signal timing indication represents a variable offset ($L_{DMRS}$) relative to one of: an initial symbol for transmission of control data, an initial symbol for transmission of at least data, an initial symbol for transmission of data only, an initial symbol comprising CORESET, an initial symbol in a slot interval, a final symbol for transmission of control data, a final symbol for transmission of at least data, a final symbol for transmission of data only, a final symbol comprising CORESET, and a final symbol in a slot interval.

In particular embodiments, the explicit reference signal timing indication represents a variable offset ($L_{DMRS}$) relative to an indicated data channel starting position. An indication of the data channel starting position may be included in the control information.

In particular embodiments, the slot of the second type is a mini-slot. The mini-slot may comprise a schedulable number of symbols. The schedulable number of symbols in a mini-slot may be restricted to values less than the number of symbols of a slot. The slot of the first type may have full length or reduced length. The reduced-length slot of the first type may be a mini-slot.

In particular embodiments, the slot is an uplink slot or a downlink slot.

In particular embodiments, the control information is a downlink assignment. The control information may be DCI.

In particular embodiments, receiving the control information comprises receiving the slot. Receiving the control information may comprise receiving the slot on a spectrum operated with configurable subcarrier spacing.

In particular embodiments, the slot is a transmission burst. The slot interval may be one in a sequence of contiguous time segments independent of transmission.

In particular embodiments, the wireless receiver is a network node, such as a gNB, or the wireless receiver is a wireless device, such as a UE.

Particular embodiments include a computer program comprising computer-readable instructions for causing at least one programmable processor to perform the method of any of the embodiments described above. Some embodiments include a computer-readable medium storing the computer program.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Third Generation Partnership Project (3GPP) 5G New Radio (NR) is based on orthogonal frequency-division multiplexing (OFDM) with a scalable numerology. The NR transmission structure includes slots and mini-slots. The embodiments described herein include methods and apparatus for signalling the location of reference signals within a slot or mini-slot.

Particular embodiments may be implemented in the context of the 3GPP NR interface in accordance with 3GPP Technical Specifications published and to be published in the 38 series. Because parts of NR terminology are still under development, however, LTE-originated terms may be used when necessary in this disclosure. Such LTE-originated terms are used in a forward-looking manner as they may apply to NR.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-10B of the drawings, like numerals being used for like and corresponding parts of the various drawings. LTE and NR are used throughout this disclosure as an example cellular system, but the ideas presented herein may apply to other wireless communication systems as well.

Figure 1:
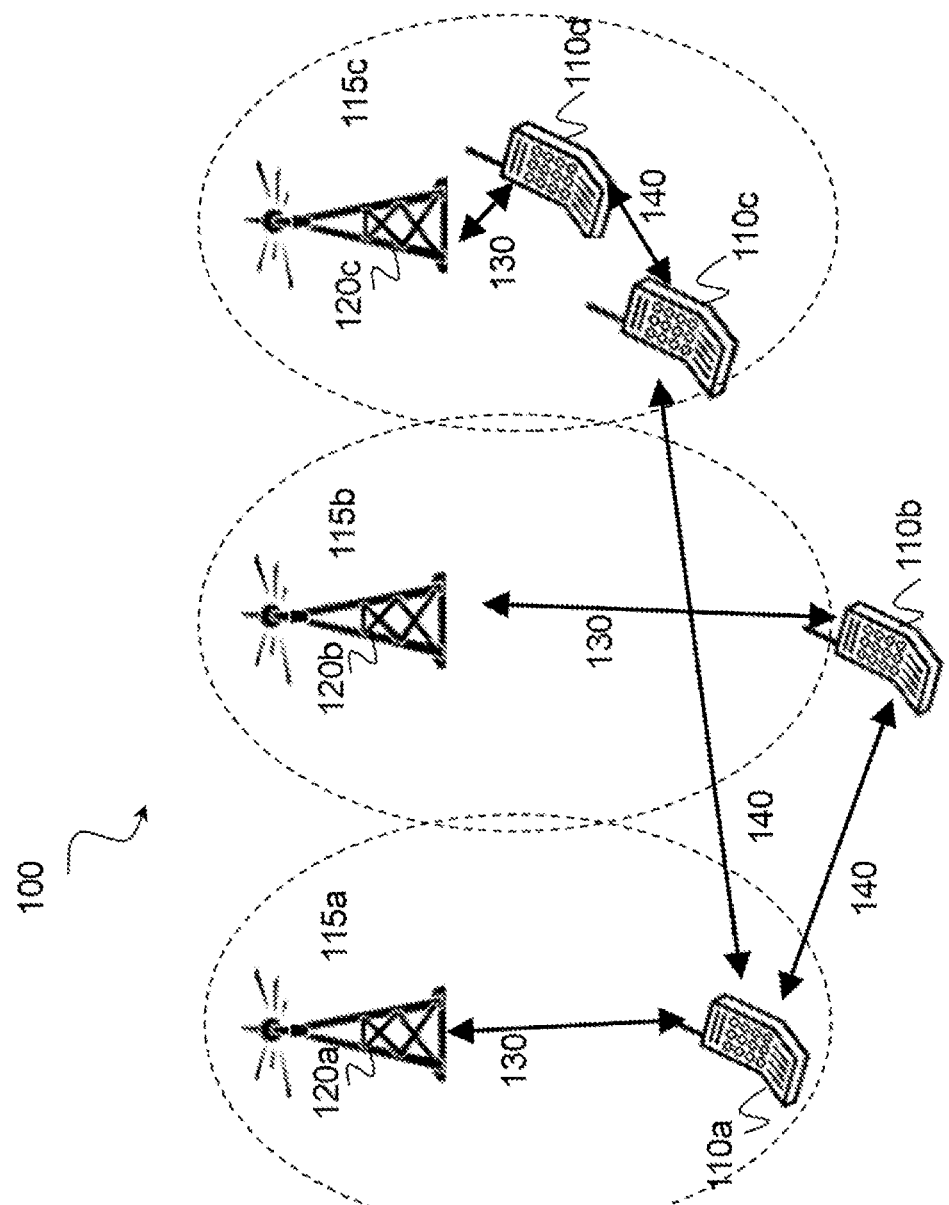
FIG. 1 is a block diagram illustrating an example wireless network, according to a particular embodiment.

FIG. 1 is a block diagram illustrating an example wireless network, according to a particular embodiment. Wireless network 100 includes one or more wireless devices 110 (such as mobile phones, smart phones, laptop computers, tablet computers, MTC devices, V2X devices, or any other devices that can provide wireless communication) and a plurality of network nodes 120 (such as base stations, eNodeBs, or gNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals.

A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120). In LTE, the interface for communicating wireless signals between network node 120 and wireless device 110 may be referred to as a Uu interface.

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Similarly, each wireless device 110 may have a single receiver or multiple receivers for receiving signals 130 from network nodes 120 or other wireless devices 110. Wireless device may receive one or more beams comprising wireless signal 130.

Wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication. In LTE, the interface for communicating wireless signal 140 between wireless devices 110 may be referred to as a PC5 interface.

Network nodes 120 may be connected to a core network via a backhaul network. The backhaul network may comprise a wired network (e.g., copper, fiber optics, etc.) or a wireless backhaul, such as a wireless relay or wireless mesh network.

Wireless signals 130 and 140 may be transmitted on time-frequency resources. The time-frequency resources may be partitioned into radio frames, subframes, slots, and/or mini-slots. Data may be scheduled for transmission based on the partitions. For example, data transmissions may be scheduled based on subframe, slot, or mini-slot. Wireless signals 130 may include reference signals, such as a demodulation reference signal (DM-RS).

Network node 120 may signal the location of reference signals within a slot or mini-slot to wireless device 110. Similarly, wireless device 110 may signal the location of reference signals within a slot or mini-slot to network node 120. Examples of signaling the location of reference signals within a slot or mini-slot are described in more detail with respect to FIGS. 2-8.

Wireless device 110, network node 120, or any other component of network 100 that transmits wireless signals may be referred to as a wireless transmitter. Wireless device 110, network node 120, or any other component of network 100 that receives wireless signals may be referred to as a wireless receiver.

Wireless device 110 monitors for downlink control signaling in one or more control resource sets (CORESETs). A control resource set contains a set of contiguous or non-contiguous physical resource blocks (PRBs) (a LTE PRB includes twelve subcarriers in the frequency domain and seven symbols in the time domain). A CORESET may span one or multiple symbols. A control resource set is located at the beginning of a slot or mini-slot. A physical downlink control channel (PDCCH) is confined to one control resource set and can be one or multiple symbols long. A PDCCH can be localized or distributed within a PDCCH control resource set. PDCCH may be time and frequency multiplexed with data.

A symbol may refer to an OFDM symbol with cyclic prefix (generally in downlink or uplink). A symbol may refer to a DFT-s-OFDM symbol with cyclic prefix (generally in uplink).

An LTE subframe lasting 1 ms contains fourteen symbols for normal cyclic prefix (CP). An NR subframe has a fixed duration of 1 ms and may therefore contain a different number of symbols for different subcarrier spacings.

An LTE slot corresponds to seven symbols for normal CP. An NR slot corresponds to seven or fourteen symbols. At 15 kHz subcarrier spacing, a slot with seven symbols occupies 0.5 ms.

An NR mini-slot, which may be regarded as a special case of a slot, may include as few as one symbol. A slot may in particular refer to a transmission burst which is transmitted from or received by a node of a communication network. The transmission burst may be an uninterrupted sequence of symbols with transmission in each. In the present disclosure, a slot interval signifies a time segment in which transmission may optionally occur. Among nodes in a communication network, in particular among nodes which have a common time base, or among which synchronization is taking place, time may be considered segmented into a sequence of contiguous slot intervals. As noted, the length of a slot interval, and thus the fineness of the segmentation of time into slot intervals, may be a function of subcarrier spacing.

In wireless network 100, each network node 120 may use any suitable radio access technology, such as long term evolution (LTE), 5G NR, LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 9A below. Similarly, a network node may include any suitable combination of hardware and/or software. For example, in particular embodiments, a network node, such as network node 120, may include the components described with respect to FIG. 10A below.

In particular embodiments, PDCCH monitoring occasions are configured. Each monitoring occasion is associated with one or more CORESETS in which PDCCH candidates may be found. Some embodiments include one monitoring occasion per slot.

The PDCCH points to the start of the scheduled transmission burst, referred to as $L_{start}$. The transmission burst may refer to a data transmission and associated DM-RS.

The location of the DM-RS, referred to as $L_{DMRS}$, may be specified in various ways. The location of the DM-RS may be specified dynamically according to $L_{start}$ found in the PDCCH (i.e., relative to the data burst). In some embodiments, the location of the DM-RS may be specified semi-statically configured as an offset from the CORESET or slot interval boundary.

In some embodiments, a bit in the PDCCH indicates which alternative to use to determine $L_{DMRS}$. Some embodiments may determine $L_{DMRS}$ based on the CORESET in which the PDCCH was found, without relying on a signaling bit in the PDCCH.

FIGS. 2-6 illustrate various examples of a control resource set with a physical downlink control channel with information indicating the location of a reference signal, according to some embodiments. Each of FIGS. 2-6 illustrate fourteen symbols. In some embodiments, the symbols may comprise OFDM symbols, DFT-OFDM symbols, or any other suitable symbol. Particular embodiments may include a different number of symbols, such as seven symbols, or any other suitable number of symbols.

Figure 2:
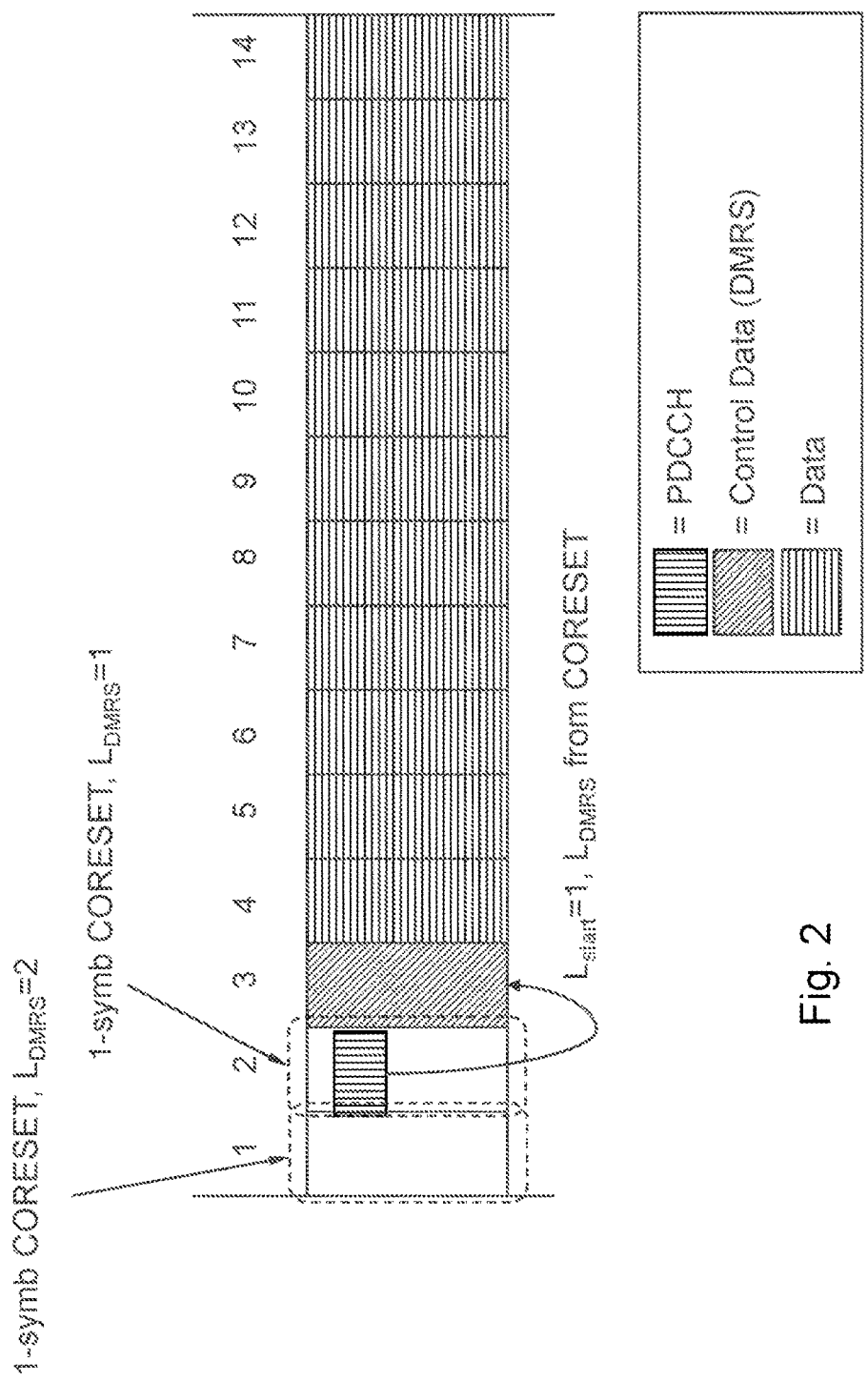
FIGS. 2-6 illustrate various examples of a control resource set with a physical downlink control channel with information indicating the location of a reference signal, according to some embodiments.

FIG. 2 illustrates two CORESETS (symbols 1 and 2). Each CORESET comprises one symbol. Symbol 3 comprises control data (DMRS) and symbols 4-14 comprise data. The CORESET in symbol 2 includes a PDCCH. The PDCCH may include signaling information. The signaling information may indicate that $L_{start}$ is 1 symbol offset from the CORESET (i.e., symbol 3). $L_{DMRS}$ may be determined based on the CORESET.

Figure 3:
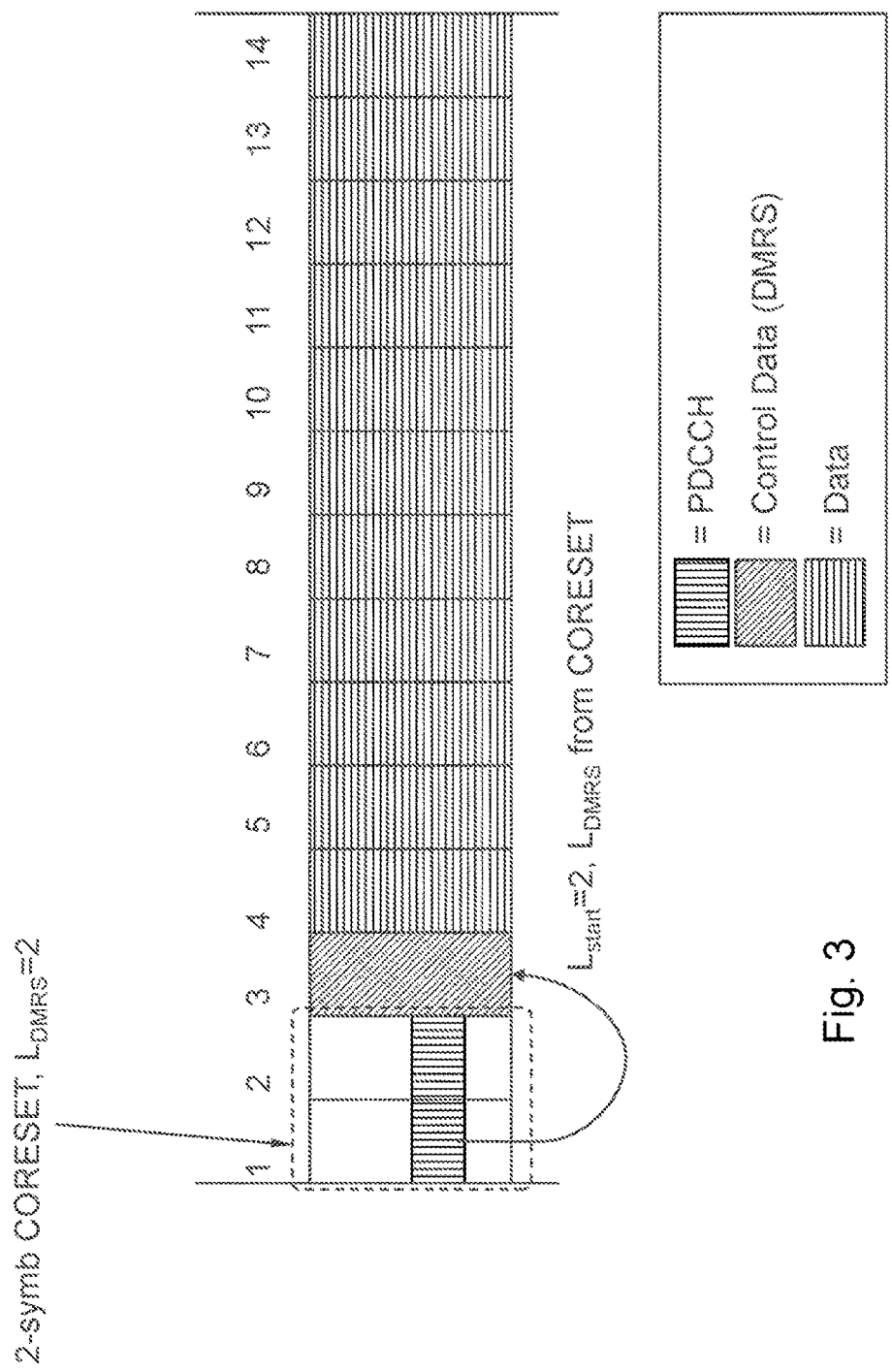

FIG. 3 illustrates one CORESET comprising two symbols (symbols 1 and 2). Symbol 3 comprises control data (DMRS) and symbols 4-14 comprise data. The CORESET in symbols 1 and 2 includes a PDCCH. The PDCCH may include signaling information. The signaling information may indicate that $L_{start}$ is 2 symbols offset from the start of the CORESET (i.e., symbol 1). $L_{DMRS}$ may be determined based on the CORESET.

Figure 4:
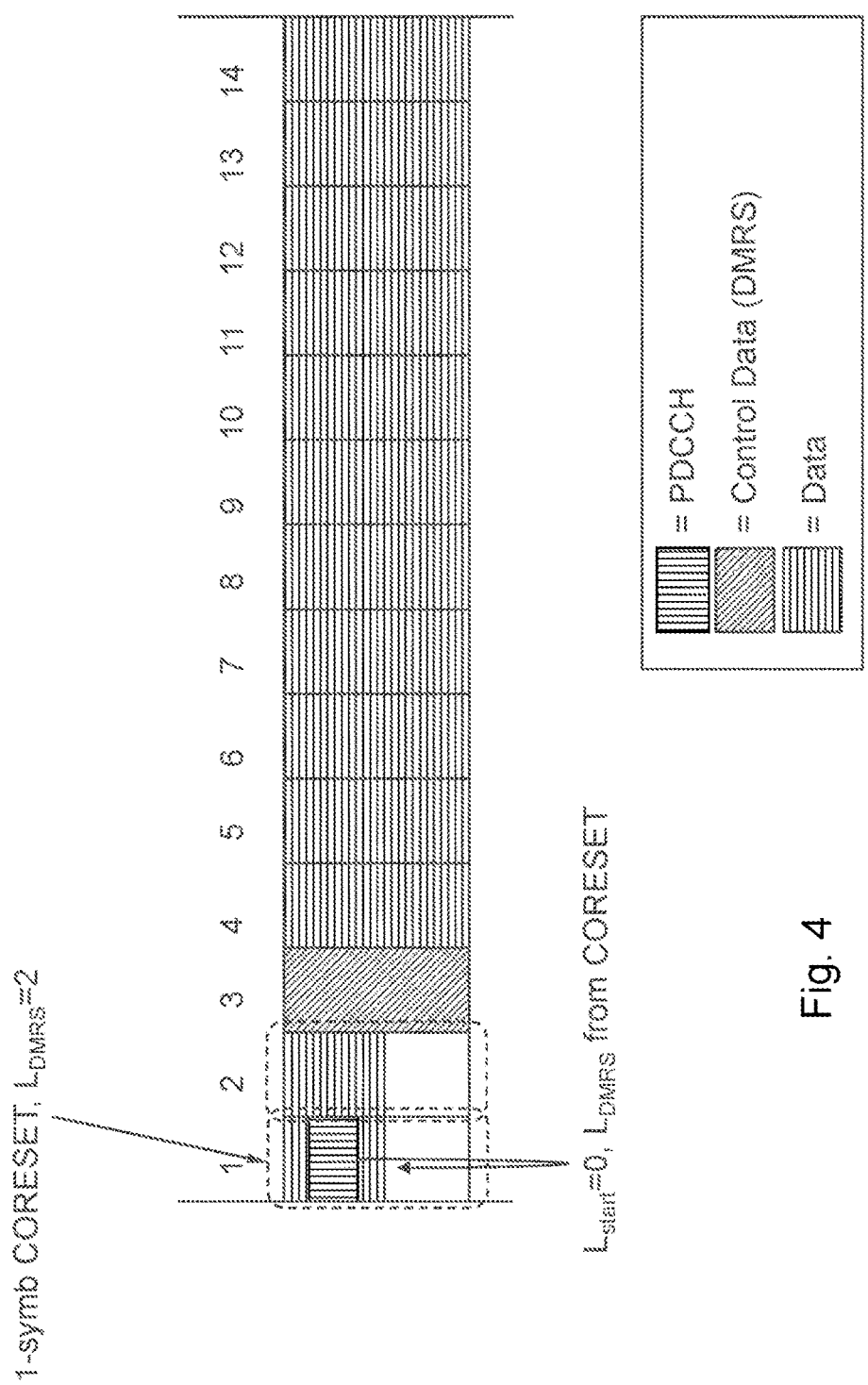

FIG. 4 illustrates two CORESETS (symbols 1 and 2). Each CORESET comprises one symbol. Symbol 3 comprises control data (DMRS) and symbols 1, 2 and 4-14 comprise data. The CORESET in symbol 1 includes a PDCCH. The PDCCH may include signaling information. The signaling information may indicate that $L_{start}$ is 0 symbols offset from the CORESET (i.e., symbol 1). $L_{DMRS}$ may be determined based on the CORESET.

Figure 5:
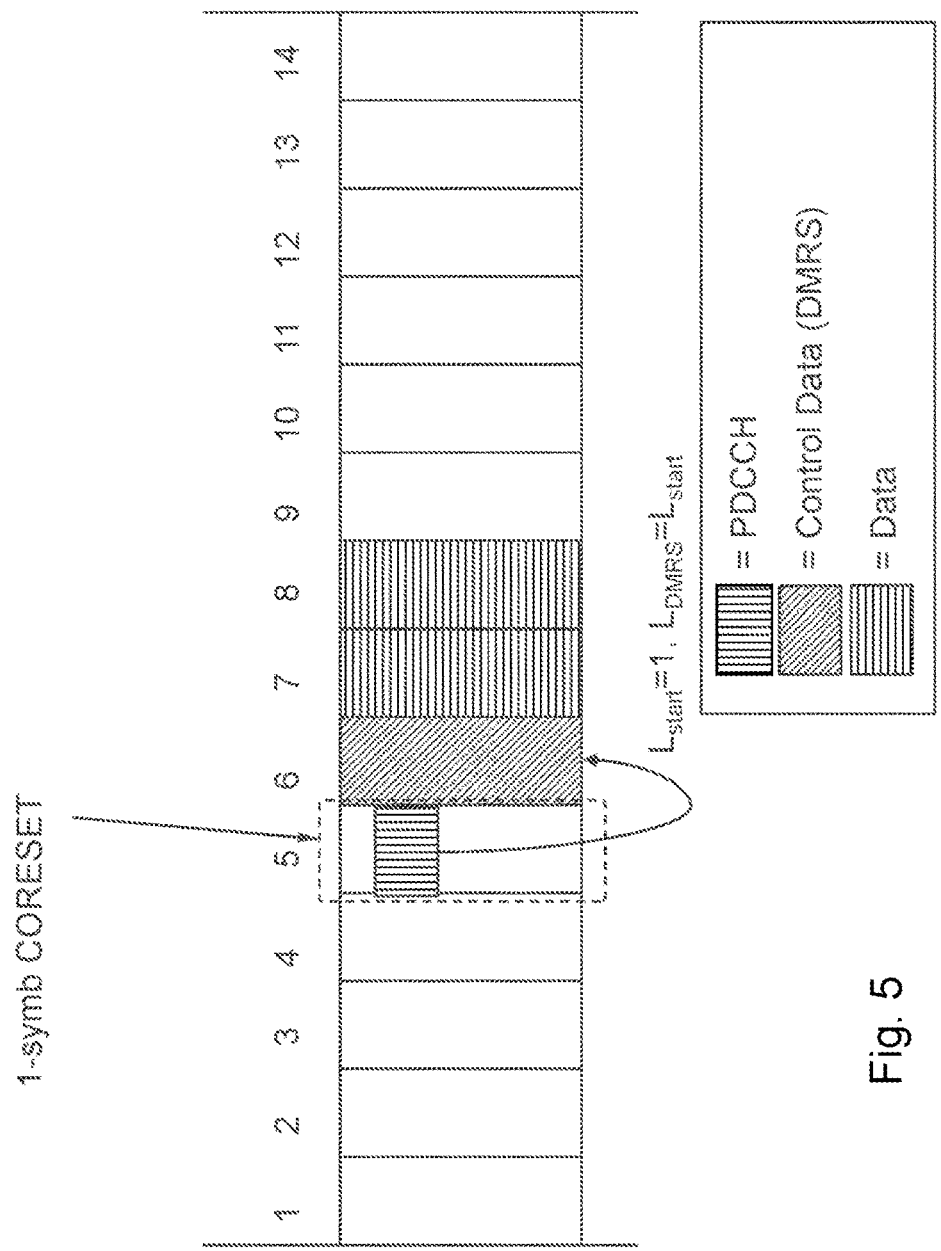

FIG. 5 illustrates one CORESETS (symbol 5). The CORESET comprises one symbol. Symbol 6 comprises control data (DMRS) and symbols 7 and 8 comprise data. The CORESET in symbol 5 includes a PDCCH. The PDCCH may include signaling information. The signaling information may indicate that $L_{start}$ is 1 symbol offset from the CORESET (i.e., symbol 6). $L_{DMRS}$ may be determined based on the $L_{start}$.

Some embodiments may include two or more DMRS in a physical downlink shared channel (PDSCH). The position of the second or additional DMRS may be derived together with the first DMRS. A first DMRS may be located near the beginning of a transmission and the second may be located in the middle of the transmission. Some embodiments may calculate the middle of the transmission and locate the DMRS there. Some embodiments may fix a DMRS position of the second DMRS relative to the first DMRS position. Some embodiments may fix a DMRS position of the second DMRS relative to the end of the transmission. These embodiments are advantageous when $L_{start}$ and $L_{DMRS}$ are different.

Figure 6:
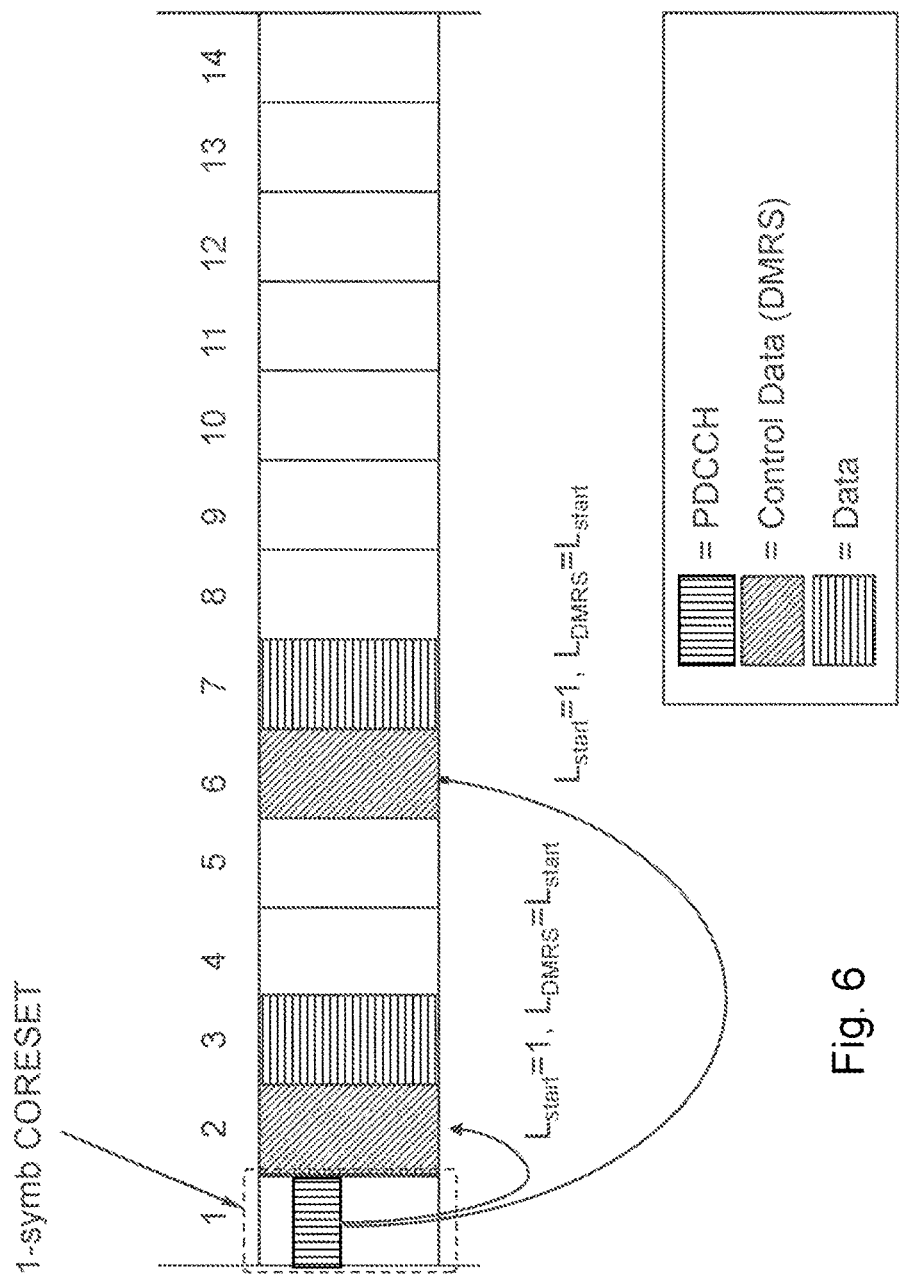

FIG. 6 illustrates one CORESETS (symbol 1). The CORESET comprises one symbol. Symbols 2 and 6 comprise control data (DMRS) and symbols 3 and 7 comprise data. The CORESET in symbol 1 includes a PDCCH. The PDCCH may include signaling information. The signaling information may indicate that $L_{start}$ is 1 symbol offset from the CORESET (i.e., symbol 2). $L_{DMRS}$ may be determined based on the $L_{start}$. The second transmission in symbols 6 and 7 may be determined relative to the first transmission in symbols 2 and 3.

Some embodiments may multiplex different user equipment (UEs) with multi-user multiple input multiple output (MU-MIMO) and they may have the same starting position of their transmissions. For downlink, there may be a gap between the DMRS and data. Uplink may not include a gap because the power adjustment (PA) in the UE may not function properly because of the gap. Some embodiments may include a UE with a single OFDM symbol CORESET and the transmission starts in the second OFDM symbol multiplexed with a UE that has its CORESET ending in the second symbol and data in the third symbol. Thus, the first UE may have its DMRS in the third OFDM symbol. The DMRS position may be offset.

Figure 7:
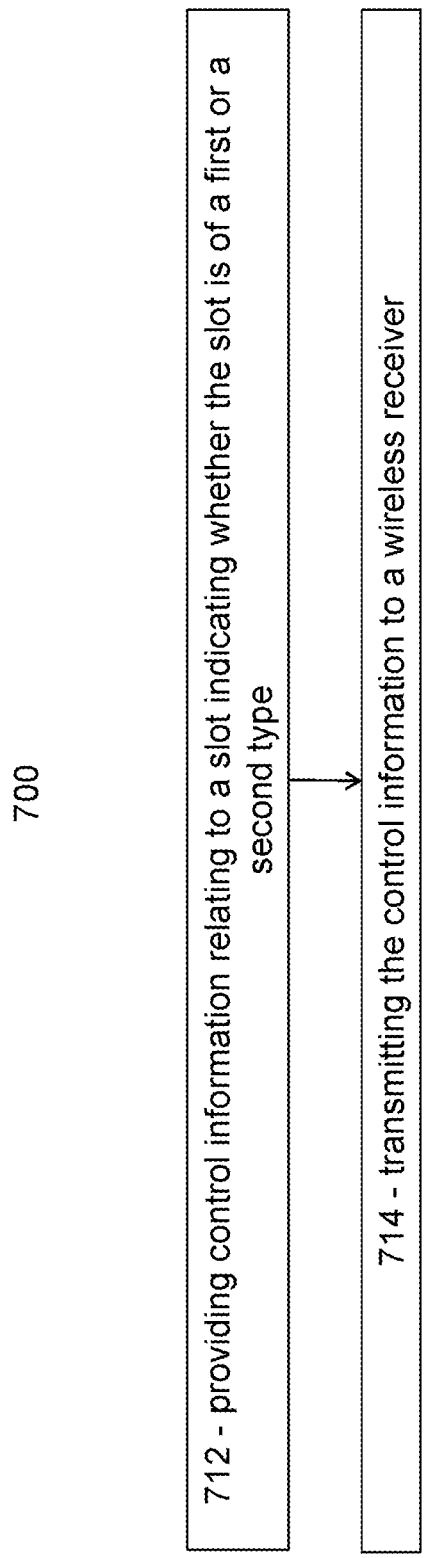
FIG. 7 is flow diagram illustrating an example method in a wireless transmitter, according to particular embodiments.
Figure 8:
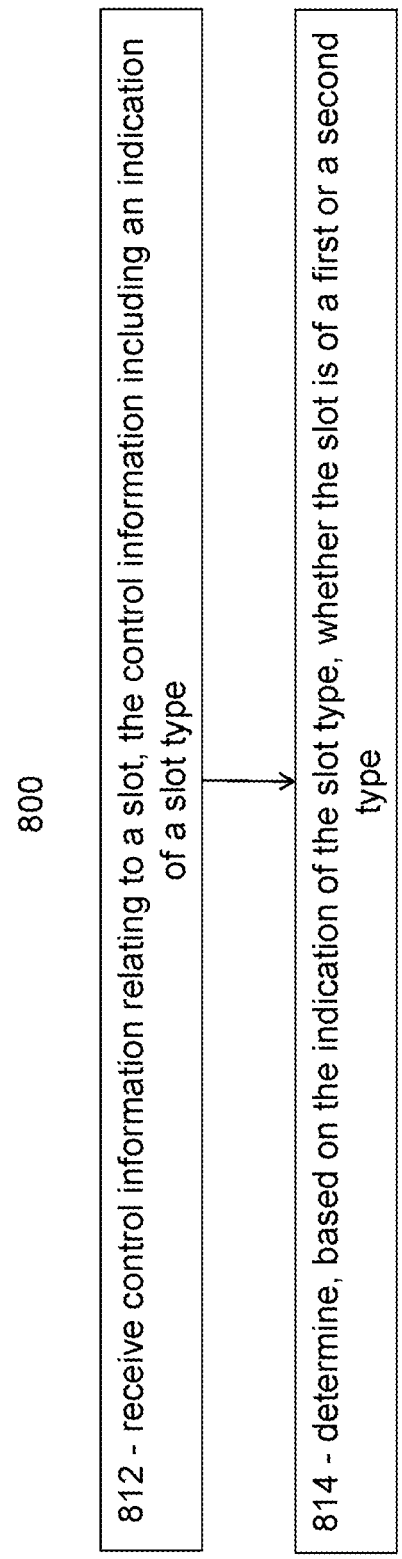
FIG. 8 is flow diagram illustrating an example method in a wireless receiver, according to particular embodiments.

The examples and embodiments described above may be generalized by the flowcharts in FIGS. 7 and 8.

FIG. 7 is flow diagram illustrating an example method in a wireless transmitter, according to some embodiments. In particular embodiments, one or more steps of FIG. 7 may be performed by network elements (e.g., wireless device 110, network node 120, etc.) of network 100 described with respect to FIG. 1.

The method begins at step 712, where the wireless transmitter provides control information relating to a slot indicating whether the slot is of a first or a second type. The control information includes a variable property allowing a receiving node to determine, based on the variable property, whether the slot is of a first or a second type. A slot of the first type starts at a slot interval boundary, and a slot of the second type starts between slot interval boundaries (including slot boundaries). The control information includes an implicit or explicit reference signal timing indication if the slot is of the second type. For example, network node 120 may provide control information relating to a slot indicating whether the slot is of a first or a second type to wireless device 110 according to any of the examples or embodiments described above, such as those described with respect to FIGS. 2-6.

In some embodiments, the variable property may comprise a bit in the PDCCH, a search space within PDCCH, a scrambling of the PDCCH CRC, a CORESET within which PDCCH is transmitted, etc.

At step 714, the wireless transmitter transmits the control information to a wireless receiver. For example, network node 120 may transmit the control information to wireless device 110 in a PDCCH. The wireless transmitter may transmit the control information according to any of the examples or embodiments described above, such as those described with respect to FIGS. 2-6.

Modifications, additions, or omissions may be made to method 700 of FIG. 7. Additionally, one or more steps in the method of FIG. 7 may be performed in parallel or in any suitable order. The steps may be repeated over time as necessary.

FIG. 8 is flow diagram illustrating an example method in a wireless receiver, according to some embodiments. In particular embodiments, one or more steps of FIG. 8 may be performed by network elements (e.g., wireless device 110, network node 120, etc.) of network 100 described with respect to FIG. 1.

The method begins at step 812, where the wireless receiver receives control information relating to a slot. The control information includes a variable property. For example, wireless device 110 may receive control information in a PDCCH from network node 120 according to any of the examples or embodiments described above, such as those described with respect to FIGS. 2-6.

At step 814, the wireless receiver determines, based on the variable property, whether the slot is of a first or a second type. A slot of the first type starts at a slot interval boundary and a slot of the second type starts between slot interval boundaries (including slot boundaries). If the slot is of the second type, an implicit or explicit reference signal timing indication is received as part of the control information. For example, wireless device 110 may determine whether the slot is of the first or second type according to any of the examples or embodiments described above, such as those described with respect to FIGS. 2-6.

Modifications, additions, or omissions may be made to method 800 of FIG. 8. Additionally, one or more steps in the method of FIG. 8 may be performed in parallel or in any suitable order. The steps may be repeated over time as necessary.

Figure 9B:
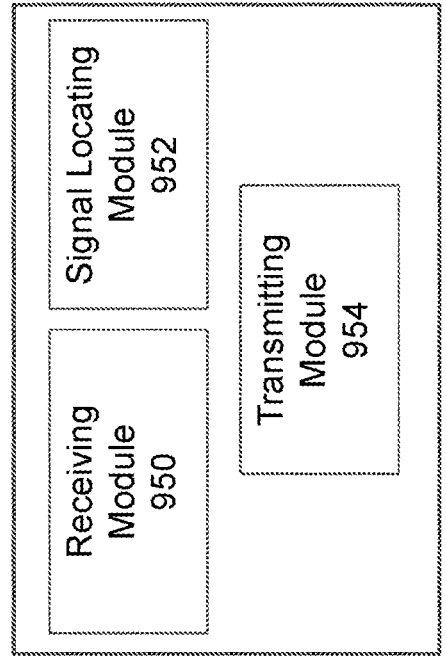
FIG. 9B is a block diagram illustrating example components of a wireless device.
Figure 9A:
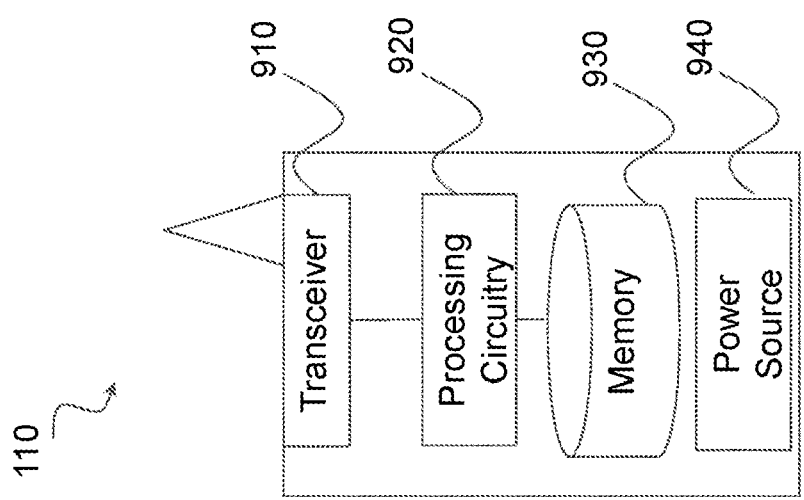
FIG. 9A is a block diagram illustrating an example embodiment of a wireless device.

FIG. 9A is a block diagram illustrating an example embodiment of a wireless device. The wireless device is an example of the wireless devices 110 illustrated in FIG. 1. In particular embodiments, the wireless device is capable of providing and/or receiving signaling information indicating a slot type (e.g., first or second types as described above) and/or the location of a reference signal in a slot or mini-slot according to any of the examples and embodiments described above.

Particular examples of a wireless device include a mobile phone, a smart phone, a PDA (Personal Digital Assistant), a portable computer (e.g., laptop, tablet), a sensor, an actuator, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 910, processing circuitry 920, memory 930, and power source 940. In some embodiments, transceiver 910 facilitates transmitting wireless signals to and receiving wireless signals from wireless network node 120 (e.g., via an antenna), processing circuitry 920 executes instructions to provide some or all of the functionality described herein as provided by the wireless device, and memory 930 stores the instructions executed by processing circuitry 920. Power source 940 supplies electrical power to one or more of the components of wireless device 110, such as transceiver 910, processing circuitry 920, and/or memory 930.

Processing circuitry 920 includes any suitable combination of hardware and software implemented in one or more integrated circuits or modules to execute instructions and manipulate data to perform some or all of the described functions of the wireless device. In some embodiments, processing circuitry 920 may include, for example, one or more computers, one more programmable logic devices, one or more central processing units (CPUs), one or more microprocessors, one or more applications, and/or other logic, and/or any suitable combination of the preceding. Processing circuitry 920 may include analog and/or digital circuitry configured to perform some or all of the described functions of wireless device 110. For example, processing circuitry 920 may include resistors, capacitors, inductors, transistors, diodes, and/or any other suitable circuit components.

Memory 930 is generally operable to store computer executable code and data. Examples of memory 930 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 940 is generally operable to supply electrical power to the components of wireless device 110. Power source 940 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 9A) responsible for providing certain aspects of the wireless device's functionality, including any of the functionality described above and/or any additional functionality (including any functionality necessary to support the solution described above).

FIG. 9B is a block diagram illustrating example components of a wireless device 110. The components may include receiving module 950, signal locating module 952, and transmitting module 954.

Receiving module 950 may perform the receiving functions of wireless device 110. For example, receiving module 950 may receive control information relating to a slot and including a variable property according to any of the examples and embodiments described above. In certain embodiments, receiving module 950 may include or be included in processing circuitry 920. In particular embodiments, receiving module 950 may communicate with signal locating module 952 and transmitting module 954.

Signal locating module 952 may perform the signal locating functions of wireless device 110. For example, as a wireless receiver signal locating module 952 may determine, based on the variable property, whether the slot is of a first or a second type according to any of the examples and embodiments described above. As a wireless transmitter, signal locating module 952 may include in a transmission a variable property indicating whether the transmission is of a first or second type according to any of the examples and embodiments described above. In certain embodiments, signal locating module 952 may include or be included in processing circuitry 920. In particular embodiments, signal locating module 952 may communicate with receiving module 950 and transmitting module 954.

Transmitting module 954 may perform the transmitting functions of wireless device 110. For example, transmitting module 954 may transmit control information relating to a slot indicating whether the slot is of a first of a second type. Transmitting module 954 may transmit control data and user data. Transmitting module 954 may transmit according to any of the examples and embodiments described above. In certain embodiments, transmitting module 954 may include or be included in processing circuitry 920. In particular embodiments, transmitting module 954 may communicate with receiving module 950 and signal locating module 952.

Figure 10B:
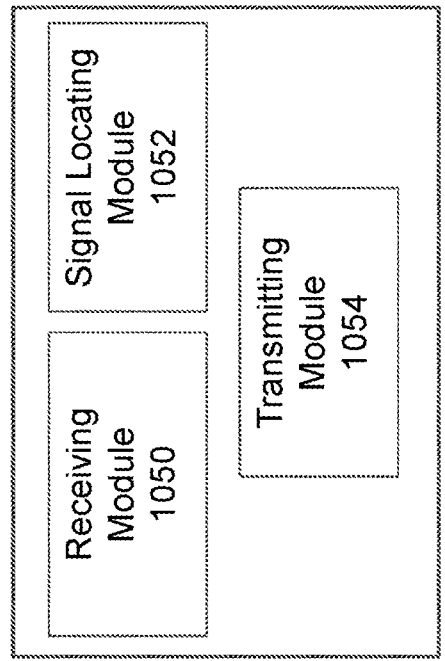
FIG. 10B is a block diagram illustrating example components of a network node.
Figure 10A:
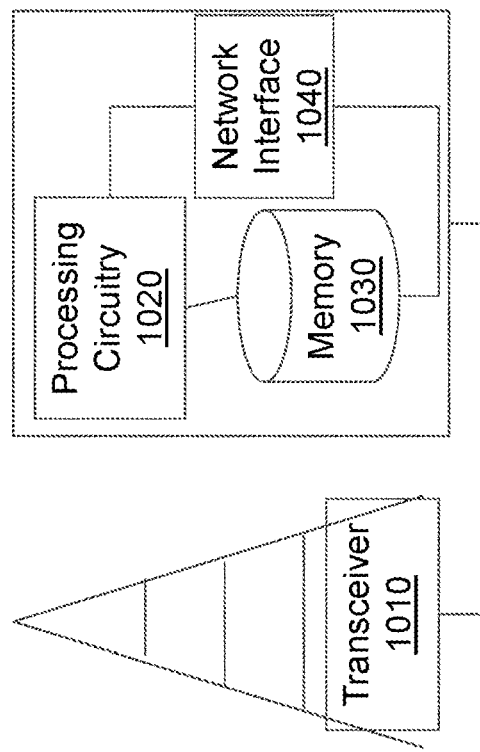
FIG. 10A is a block diagram illustrating an example embodiment of a network node.

FIG. 10A is a block diagram illustrating an example embodiment of a network node. The network node is an example of the network node 120 illustrated in FIG. 1. In particular embodiments, the network node is capable of providing and/or receiving signaling information indicating a slot type (e.g., first or second types as described above) and/or the location of a reference signal in a slot or mini-slot according to any of the examples and embodiments described above.

Network node 120 can be an eNodeB, a gNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1010, at least one processing circuitry 1020, at least one memory 1030, and at least one network interface 1040. Transceiver 1010 facilitates transmitting wireless signals to and receiving wireless signals from a wireless device, such as wireless devices 110 (e.g., via an antenna); processing circuitry 1020 executes instructions to provide some or all of the functionality described above as being provided by a network node 120; memory 1030 stores the instructions executed by processing circuitry 1020; and network interface 1040 communicates signals to backend network components, such as a gateway, switch, router, Internet, Public Switched Telephone Network (PSTN), controller, and/or other network nodes 120. Processing circuitry 1020 and memory 1030 can be of the same types as described with respect to processing circuitry 920 and memory 930 of FIG. 9A above.

In some embodiments, network interface 1040 is communicatively coupled to processing circuitry 1020 and refers to any suitable device operable to receive input for network node 120, send output from network node 120, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network.

Other embodiments of network node 120 include additional components (beyond those shown in FIG. 10A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 10B is a block diagram illustrating example components of a network node 120. The components may include receiving module 1050, signal locating module 1052, and transmitting module 1054.

Receiving module 1050 may perform the receiving functions of network node 120. For example, receiving module 1050 may receive control information relating to a slot and including a variable property according to any of the examples and embodiments described above. In certain embodiments, receiving module 1050 may include or be included in processing circuitry 1020. In particular embodiments, receiving module 1050 may communicate with signal locating module 1052 and transmitting module 1054.

Signal locating module 1052 may perform the signal locating functions of network node 120. For example, as a wireless receiver signal locating module 1052 may determine, based on the variable property, whether the slot is of a first or a second type according to any of the examples and embodiments described above. As a wireless transmitter, signal locating module 1052 may determine whether a transmission is of a first or second type, and include in a transmission a variable property indicating whether the transmission is of a first or second type according to any of the examples and embodiments described above. In certain embodiments, signal locating module 1052 may include or be included in processing circuitry 1020. In particular embodiments, signal locating module 1052 may communicate with receiving module 1050 and transmitting module 1054.

Transmitting module 1054 may perform the transmitting functions of network node 120. For example, transmitting module 1054 may transmit control information relating to a slot indicating whether the slot is of a first of a second type. Transmitting module 1054 may transmit control data and user data. Transmitting module 1054 may transmit according to any of the examples and embodiments described above. In certain embodiments, transmitting module 1054 may include or be included in processing circuitry 1020. In particular embodiments, transmitting module 1054 may communicate with receiving module 1050 and signal locating module 1052.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

ABBREVIATIONS USED IN THE PRECEDING DESCRIPTION INCLUDE

3GPP Third Generation Partnership Project
BTS Base Transceiver Station
D2D Device to Device
DMRS Demodulation Reference Signal
eNB eNodeB
FDD Frequency Division Duplex
HARQ Hybrid Automatic Repeat Request
LTE Long Term Evolution
MAC Medium Access Control
M2M Machine to Machine
MIMO Multi-Input Multi-Output
MTC Machine Type Communication
NR New Radio
OFDM Orthogonal Frequency Division Multiplexing
PDCCH Physical Downlink Control Channel
PDSCH Physical Downlink Shared Channel
PUCCH Physical Uplink Control Channel
RAN Radio Access Network
RAT Radio Access Technology
RBS Radio Base Station
RNC Radio Network Controller
RRC Radio Resource Control
RRH Remote Radio Head
RRU Remote Radio Unit
SNR Signal-to-Interference-plus-Noise Ratio
TDD Time Division Duplex
UE User Equipment
UL Uplink
URLLC Ultra-Reliable Low-Latency Communication
UTRAN Universal Terrestrial Radio Access Network
WAN Wireless Access Network

The invention claimed is:

1. A method for use in a wireless transmitter of a wireless communication network, the method comprising:
transmitting, to a wireless receiver of the wireless communication network, control information relating to a slot, the control information including:
an indication of whether the slot is of a first type or a second type; and
when the slot is of the second type, a reference signal timing indication;
wherein:
a slot of the first type corresponds with a prescheduled slot interval; and
a slot of the second type either starts between prescheduled slot interval boundaries and has an arbitrary length or starts at a prescheduled slot interval boundary and has a reduced length.

2. The method of claim 1, wherein an explicit reference signal timing indication is absent in the control information when the slot is of the first type, the absence of an explicit reference signal timing indication signifying a predefined reference signal timing.

3. The method of claim 2, wherein the predefined reference signal timing is a predefined offset relative to a predetermined symbol in the slot, the predetermined symbol being one of:
an initial symbol for transmission of control data,
an initial symbol for transmission of at least data,
an initial symbol for transmission of data only,
an initial symbol comprising a control resource set, CORESET, to be monitored for downlink control signaling,
an initial symbol in a slot interval,
a final symbol for transmission of control data,
a final symbol for transmission of at least data,
a final symbol for transmission of data only,
a final symbol comprising a CORESET to be monitored for downlink control signaling, and
a final symbol in a slot interval.

4. The method of claim 2, wherein the control information includes an indication of a data channel starting position, and the predefined reference signal timing is a predefined offset relative to the indicated data channel starting position.

5. The method of claim 1, wherein the reference signal comprises a demodulation reference signal, DM-RS.

6. The method of claim 1, wherein the reference signal timing indication is associated with a plurality of reference signals.

7. The method of claim 6, wherein each reference signal in the plurality of reference signals has independent timing.

8. The method of claim 6, wherein a first reference signal in the plurality of reference signals has independent timing and a second reference signal in the plurality of reference signals has a fixed offset relative to the first reference signal, and wherein the reference signal timing indication comprises an explicit timing indication of the first but not of the second reference signal.

9. The method of claim 1, wherein the control information comprises an explicit reference signal timing indication for at least one reference signal.

10. The method of claim 1, wherein the slot of the second type is a mini-slot comprising a schedulable number of symbols, and the schedulable number of symbols is less than the number of symbols of a slot interval.

11. A wireless transmitter comprising processing circuitry operable to:
transmit, to a wireless receiver, control information relating to a slot, the control information including:
an indication of whether the slot is of a first type or a second type; and
when the slot is of the second type, a reference signal timing indication;
wherein:
a slot of the first type corresponds with a predetermined slot interval; and
a slot of the second type either starts between predetermined slot interval boundaries and has an arbitrary length or starts at a predetermined slot interval boundary and has a reduced length.

12. The wireless transmitter of claim 11, wherein an explicit reference signal timing indication is absent in the control information when the slot is of the first type, the absence of an explicit reference signal timing indication signifying a predefined reference signal timing.

13. The wireless transmitter of claim 12, wherein the predefined reference signal timing is a predefined offset relative to a symbol in the slot being one of:
an initial symbol for transmission of control data,
an initial symbol for transmission of at least data,
an initial symbol for transmission of data only,
an initial symbol comprising a control resource set, CORESET, to be monitored for downlink control signaling,
an initial symbol in a slot interval,
a final symbol for transmission of control data,
a final symbol for transmission of at least data,
a final symbol for transmission of data only,
a final symbol comprising a CORESET to be monitored for downlink control signaling, and
a final symbol in a slot interval.

14. The wireless transmitter of claim 12, wherein the control information includes an indication of a data channel starting position, and the predefined reference signal timing is a predefined offset relative to the indicated data channel starting position.

15. The wireless transmitter of claim 11, wherein the reference signal comprises a demodulation reference signal, DM-RS.

16. The wireless transmitter of claim 11, wherein the reference signal timing indication is associated with a plurality of reference signals.

17. The wireless transmitter of claim 16, wherein each reference signal in the plurality of reference signals has independent timing.

18. The wireless transmitter of claim 16, wherein a first reference signal in the plurality of reference signals has independent timing and a second reference signal in the plurality of reference signals has a fixed offset relative to the first reference signal, and wherein the reference signal timing indication comprises an explicit timing indication of the first but not of the second reference signal.

19. The wireless transmitter of claim 11, wherein the control information comprises an explicit reference signal timing indication for at least one reference signal.

20. The wireless transmitter of claim 11, wherein the slot of the second type is a mini-slot comprising a schedulable number of symbols, and the schedulable number of symbols is less than the number of symbols of a slot interval.

21. A method for use in a wireless receiver of a wireless communication network, the method comprising:
receiving, from a transmitter of the wireless communication network, control information relating to a slot, wherein the control information includes an indication of a slot type; and
determining, based on the indication of the slot type, whether the slot is of a first or a second type, wherein a slot of the first type starts at a slot interval boundary and a slot of the second type either starts between slot interval boundaries and has arbitrary length or starts at a slot interval boundary and has reduced length;
wherein, if the slot is of the second type, a reference signal timing indication is received as part of the control information.

22. A wireless receiver comprising processing circuitry (920, 1020) operable to:
receive, from a transmitter, control information relating to a slot, wherein the control information includes an indication of a slot type; and
determine, based on the indication of the slot type, whether the slot is of a first or a second type, wherein a slot of the first type starts at a slot interval boundary and a slot of the second type either starts between slot interval boundaries and has arbitrary length or starts at a slot interval boundary and has reduced length;
wherein, if the slot is of the second type, a reference signal timing indication is received as part of the control information.

* * * * *